US008543136B2

(12) United States Patent
Lim et al.

(10) Patent No.: US 8,543,136 B2
(45) Date of Patent: Sep. 24, 2013

(54) DEVICE AND METHOD OF ESTIMATING LOCATION OF TERMINAL USING SEQUENCES TRANSMITTED FROM BASE STATIONS

(75) Inventors: Jong Bu Lim, Pohang-si (KR); Kyung Hun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 637 days.

(21) Appl. No.: 12/715,986

(22) Filed: Mar. 2, 2010

(65) Prior Publication Data

US 2011/0009129 A1    Jan. 13, 2011

(30) Foreign Application Priority Data

Jul. 13, 2009 (KR) .................. 10-2009-0063327

(51) Int. Cl.
*H04W 24/00* (2009.01)
(52) U.S. Cl.
USPC .......... 455/456.5; 455/65; 455/502; 455/561; 370/342; 370/344
(58) Field of Classification Search
USPC ............ 455/456.1–456.3, 456.5, 456.6, 63.4, 455/65, 456.1–457, 561, 450; 342/357.48, 342/450; 701/468, 470, 471; 370/335, 342, 370/344
See application file for complete search history.

(56) References Cited

U.S. PATENT DOCUMENTS

| 5,081,462 | A  | *  | 1/1992  | Tachita et al. ................. 342/352 |
| 5,657,487 | A  |    | 8/1997  | Doner |
| 6,122,512 | A  |    | 9/2000  | Bodin |
| 6,246,861 | B1 |    | 6/2001  | Messier et al. |
| 6,473,619 | B1 | *  | 10/2002 | Kong et al. ................. 455/456.1 |
| 6,539,229 | B1 |    | 3/2003  | Ali |
| 6,725,062 | B1 | *  | 4/2004  | Paranchych .................. 455/561 |
| 7,616,595 | B2 | *  | 11/2009 | Classon et al. ................ 370/319 |
| 8,014,361 | B2 | *  | 9/2011  | Ozluturk ....................... 370/335 |
| 8,036,197 | B2 | *  | 10/2011 | Pajukoski et al. ............. 370/342 |
| 2004/0203864 | A1 | * | 10/2004 | DiBuduo .................. 455/456.1 |
| 2007/0109186 | A1 |   | 5/2007  | Fujiwara et al. |

(Continued)

FOREIGN PATENT DOCUMENTS

EP    1 235 077 A2    8/2002
EP    1 850 267 A1    10/2007

(Continued)

OTHER PUBLICATIONS

European Extended Search Report mailed Dec. 7, 2012, issued in counterpart European Patent Application No. 10 799 993.0; 6 pages in English language.

*Primary Examiner* — Sharad Rampuria
(74) *Attorney, Agent, or Firm* — NSIP Law

(57) ABSTRACT

A terminal receives a unique sequence from each of at least two base stations, and transmits a mixture of quantized unique sequences to a serving base station. The serving base station extracts components respectively corresponding to base stations from the mixture of the quantized unique sequences, and estimates a location of a terminal based on the extracted components. The serving base station may calculate a received signal strength or a delay for each of the unique sequences received by the terminal, based on the extracted components, and estimate the location of the terminal based on the received signal strength or the delay. In addition, the terminal may estimate its own location by performing an algorithm used by the serving base station.

19 Claims, 7 Drawing Sheets

(56) References Cited

U.S. PATENT DOCUMENTS

| | | | |
|---|---|---|---|
| 2007/0202887 A1 | 8/2007 | Counts et al. | |
| 2007/0298761 A1* | 12/2007 | Bani Hani | 455/404.2 |
| 2008/0287139 A1 | 11/2008 | Carlson et al. | |
| 2008/0318596 A1* | 12/2008 | Tenny | 455/456.2 |
| 2009/0213833 A1* | 8/2009 | Cai et al. | 370/350 |
| 2010/0330917 A1* | 12/2010 | Choi et al. | 455/63.1 |
| 2012/0093043 A1* | 4/2012 | Choi et al. | 370/280 |

FOREIGN PATENT DOCUMENTS

| | | |
|---|---|---|
| JP | 2005-012846 | 1/2005 |
| KR | 100290926 | 3/2001 |
| KR | 10-0562248 | 3/2006 |
| KR | 10-0721517 | 5/2007 |
| KR | 10-0834634 | 5/2008 |
| WO | WO-00/16436 A2 | 3/2000 |

* cited by examiner

DEVICE AND METHOD OF ESTIMATING LOCATION OF TERMINAL USING SEQUENCES TRANSMITTED FROM BASE STATIONS

CROSS-REFERENCE TO RELATED APPLICATION

This application claims the benefit under 35 U.S.C. §119 (a) of a Korean Patent Application No. 10-2009-0063327, filed on Jul. 13, 2009, in the Korean Intellectual Property Office, the entire disclosure of which is incorporated herein by reference for all purposes.

BACKGROUND

1. Field

The following description relates to a technology to estimate a location of a terminal, and more particularly, to a technology to estimate a location of a terminal by using signals transmitted from base stations.

2. Description of Related Art

Research has increased regarding a multi-cell communication environment including a plurality of cells. For example, the multi-cell communication environment may include a multi-macro cell communication environment including at least two macro cells, a multi-small cell communication environment including a plurality of small cells, such as picocells and femtocells, and a layer-cell communication environment including at least one macrocell and at least one small cell.

Location information of a terminal in a communication system of the multi-cell communication environment may be used for various purposes. For example, the location information of the terminal may be essential to provide location-based service, and may facilitate multi-node cooperative communication.

Also, an efficient method of estimating the location of the terminal includes detecting the location of the terminal based on an identification (ID) of a service cell that serves the terminal. However, the method of detecting the location of the terminal based on the ID of the service cell may not accurately detect the location of the terminal. There has been an attempt to apply Time of Arrival (ToA)-based location estimating method to improve accuracy, or an attempt to attach a Global Positioning System (GPS) receiver to a terminal. More specifically, the ToA-based location estimating method estimates the location of the terminal based on arrival time of signals received from the plurality of existing base stations, and when the GPS receiver is included in the terminal, the terminal reports its location to the base station.

However, the terminal sequentially measures arrival time of each of the received signals to perform the ToA-based location estimating method, and thus, power consumption of the terminal may increase. In addition, the base stations and the terminal require an accurately synthesized clock to accurately apply the ToA-based location estimating method, which leaves room for error and problems in application of the ToA-based location estimating method. Also, attaching the GPS receiver to the terminal may increase overall cost of the terminal.

SUMMARY

In one general aspect, there is provided a location estimating method used in a serving base station, the method including receiving information related to a mixture of unique sequences received by a terminal, in response to the unique sequences being transmitted from adjacent base stations, extracting components respectively corresponding to the adjacent base stations from the mixture of the unique sequences received by the terminal, and estimating a location of the terminal based on the components respectively corresponding to the adjacent base stations.

The estimating of the location of the terminal may include estimating the location of the terminal based on the components respectively corresponding to the adjacent base stations and locations of the adjacent base stations.

The estimating of the location of the terminal may include estimating the location of the terminal based on transmission power of each adjacent base station with respect to each of the unique sequences.

The estimating of the location of the terminal may include predicting distances between the terminal and the adjacent base stations based on the components respectively corresponding to the adjacent base stations, and estimates the location of the terminal based on the distances between the terminal and the adjacent base stations.

The estimating of the location of the terminal may include calculating received signal strengths or delays with respect to the unique sequences received from the adjacent base stations based on the components respectively corresponding to the adjacent base stations, and estimating the location of the terminal based on the received signal strengths or the delays with respect to the unique sequences received from the adjacent base stations.

The extracting of the components may include extracting the components respectively corresponding to the adjacent base stations by using a memory where the unique sequences of the adjacent base stations or cell identifications (IDs) of the adjacent base stations are stored in advance.

The information related to the mixture of the unique sequences received by the terminal may include information that is generated by quantizing the mixture of the unique sequences received by the terminal.

Each of the unique sequences may be designed to be individually extracted from the mixture of the unique sequences.

Each of the unique sequences may be generated based on a cell ID of each of the adjacent base stations, and the unique sequences may be transmitted respectively from the adjacent base stations at a same point in time via a synchronization channel.

The location estimating method used in the serving base station may further include transmitting a location estimation request to the terminal to estimate the location of the terminal.

In another general aspect, there is provided a location estimating method used in a terminal, the method including receiving a location estimation request from a serving base station, receiving unique sequences transmitted from adjacent base stations in response to the reception of the location estimation request, and transmitting information related to a mixture of the received unique sequences to the serving base station.

The location estimating method used in a terminal may further include quantizing the mixture of the received unique sequences without decoding the received unique sequences, to generate information related to the mixture of the received unique sequences.

The receiving of the unique sequences may simultaneously receive the unique sequences respectively from the adjacent base stations via a synchronization channel.

In another general aspect, there is provided a location estimating method used in a terminal, the method including receiving unique sequences transmitted from at least two base stations, extracting components respectively corresponding to the at least two base stations from a mixture of the unique sequences received by the terminal, and estimating a location of the terminal based on the components respectively corresponding to the base stations.

The location estimating method used in the terminal may further include outputting information related to the estimated location of the terminal.

The estimating of the location of the terminal may include calculating received signal strengths or delays with respect to the unique sequences received from the at least two base stations based on the components respectively corresponding to the at least two base stations, and estimating the location of the terminal based on the received signal strengths or delays with respect to the unique sequences received from the at least two base stations.

In another general aspect, there is provided a computer-readable storage medium storing a program to perform a location estimating method in a serving base station, including instructions to cause a computer to receive information related to a mixture of unique sequences received by a terminal, in response to the unique sequences being transmitted from adjacent base stations, extract components respectively corresponding to the adjacent base stations from the mixture of the unique sequences received by the terminal, and estimate a location of the terminal based on the components respectively corresponding to the adjacent base stations In another general aspect, there is provided a location estimating device used in a serving base station, the device including a receiving unit to receive information related to a mixture of unique sequences received by a terminal, when the unique sequences are transmitted from adjacent base stations, an extracting unit to extract components respectively corresponding to the adjacent base stations from the mixture of the unique sequences received by the terminal, and an estimating unit to estimate a location of the terminal based on the components respectively corresponding to the adjacent base stations.

The location estimating device used in the serving base station may further include a calculating unit to calculate received signal strengths or delays with respect to the unique sequences received from the adjacent base stations, based on the components respectively corresponding to the adjacent base stations. The estimating unit may estimate the location of the terminal based on at least one of the received signal strengths and delays with respect to the unique sequences received from the adjacent base stations and also based on at least one of locations of the adjacent base stations and transmission power of the adjacent base stations with respect to the unique sequences.

The location estimating device used in the serving base station may further include a requesting unit to transmit a location estimation request to the terminal to estimate the location of the terminal.

In another general aspect, there is provided a location estimating device used in a terminal, the device including a request processing unit to process a location estimation request from a serving base station, a sequence receiving unit to receive unique sequences transmitted from adjacent base stations in response to the reception of the location estimation request, and a transmitting unit to transmit information related to a mixture of the received unique sequences to the serving base station.

In another general aspect, there is provided a location estimating method and apparatus that may not require a GPS receiver, thereby decreasing a cost for production of a terminal In another general aspect, there is provided a location estimating method and apparatus that may accurately estimate a location of the terminal without requiring an accurately synchronized clock.

In another general aspect, there is provided a location estimating method and apparatus that may use unique sequences that base stations simultaneously transmit via a synchronization channel, thereby effectively estimating the location of the terminal.

In another general aspect, there is provided a location estimating method and apparatus that may use unique sequences of base stations to estimate a location of a terminal, and may easily separate each of the unique sequences even the unique sequences are mixed together.

In another general aspect, there is provided a location estimating method and apparatus that may estimate a location of a terminal from a plurality of base stations based on received signal strengths or delays with respect to received unique sequences, thereby increasing accuracy.

Other features and aspects will be apparent from the following detailed description, the drawings, and the claims.

Figure 1:
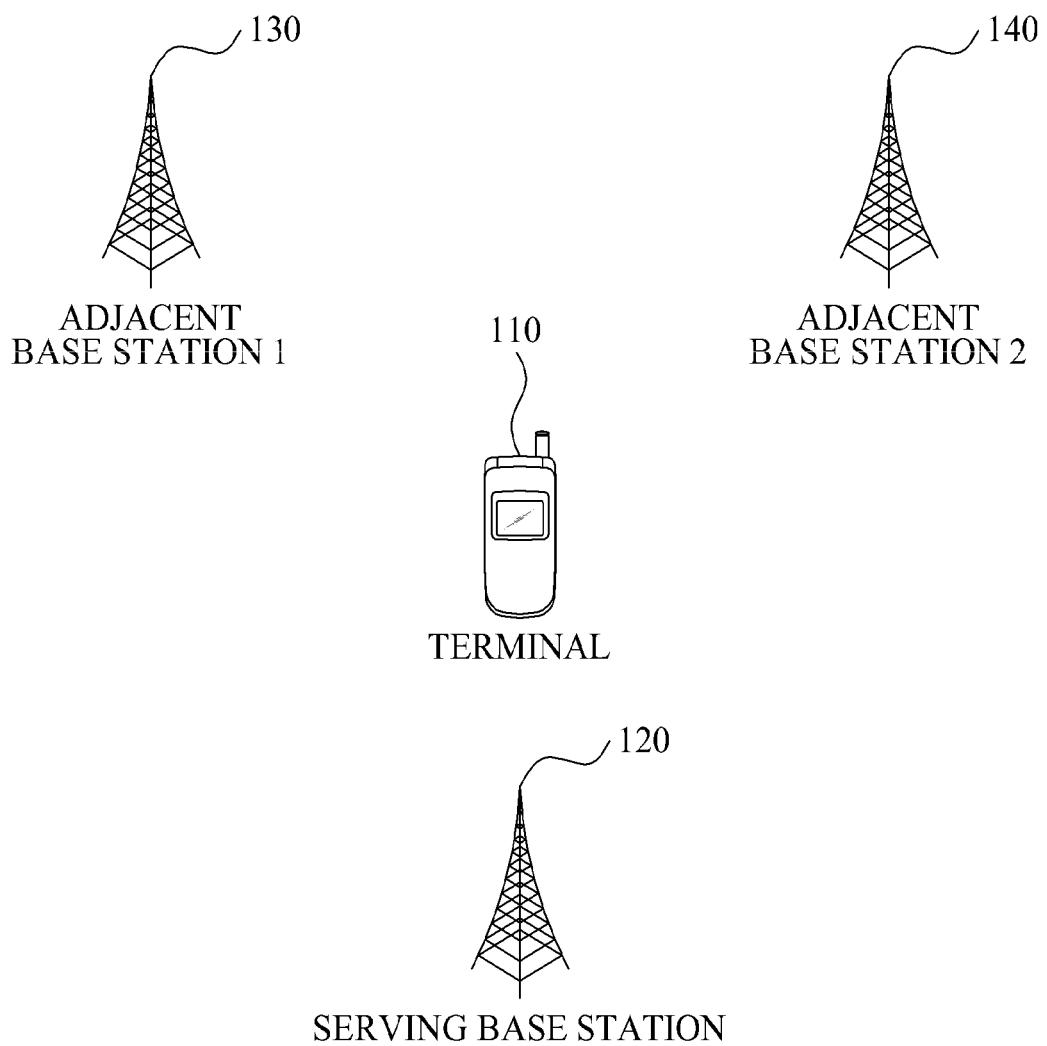
FIG. 1 is a diagram illustrating a plurality of base stations and a terminal of a related art.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates a plurality of base stations and a terminal of a related art.

FIG. 1 includes a serving base station 120, an adjacent base station (1) 130, an adjacent base station (2) 140, and a terminal 110.

Various standards such as a Third Generation Partnership Project Long Term Evolution (3GPP LTE) standard and the like, and a general mobile communication system define the following characteristics.

Referring to FIG. 1, each of the serving base station 120, the adjacent base station (1) 130, and the adjacent base station (2) 140 may generate and transmit a unique sequence at a same point in time. Here, each of the serving base station 120, the adjacent base station (1) 130 and the adjacent base station (2) 140 may generate the unique sequence to perform synchronization based on a unique cell identification (ID), and may transmit the unique sequence corresponding to the synchronization via a synchronization channel at the same point in time at identical time intervals. The unique sequence corresponding to synchronization, which is the unique sequence being transmitted via the synchronization channel, may be referred to as 'synchronization channel sequence.'

Referring again to FIG. 1, although unique sequences transmitted from the serving base station 120, the adjacent base station (1) 130 and the adjacent base station (2) 140 are mixed together, the unique sequences are designed to be individually extracted. For example, the serving base station 120, the adjacent base station (1) 130 and the adjacent base station (2) 140 may generate unique sequences by using a constant amplitude zero auto-correlation (CAZAC) code, an m-sequence, or an orthogonal code.

Accordingly, the terminal 110, the serving base station 120, the adjacent base station (1) 130 and the adjacent base station (2) 140 may extract components respectively corresponding to the serving base station 120, the adjacent base station (1) 130, and the adjacent base station (2) 140 from the mixture of the plurality of unique sequences.

According to example embodiments described below, the location estimating method and the device may use the described characteristics, and thereby may relatively accurately estimate the location of the terminal 110 while reducing a production cost of the terminal 110 and decreasing overall power consumption.

Figure 2:
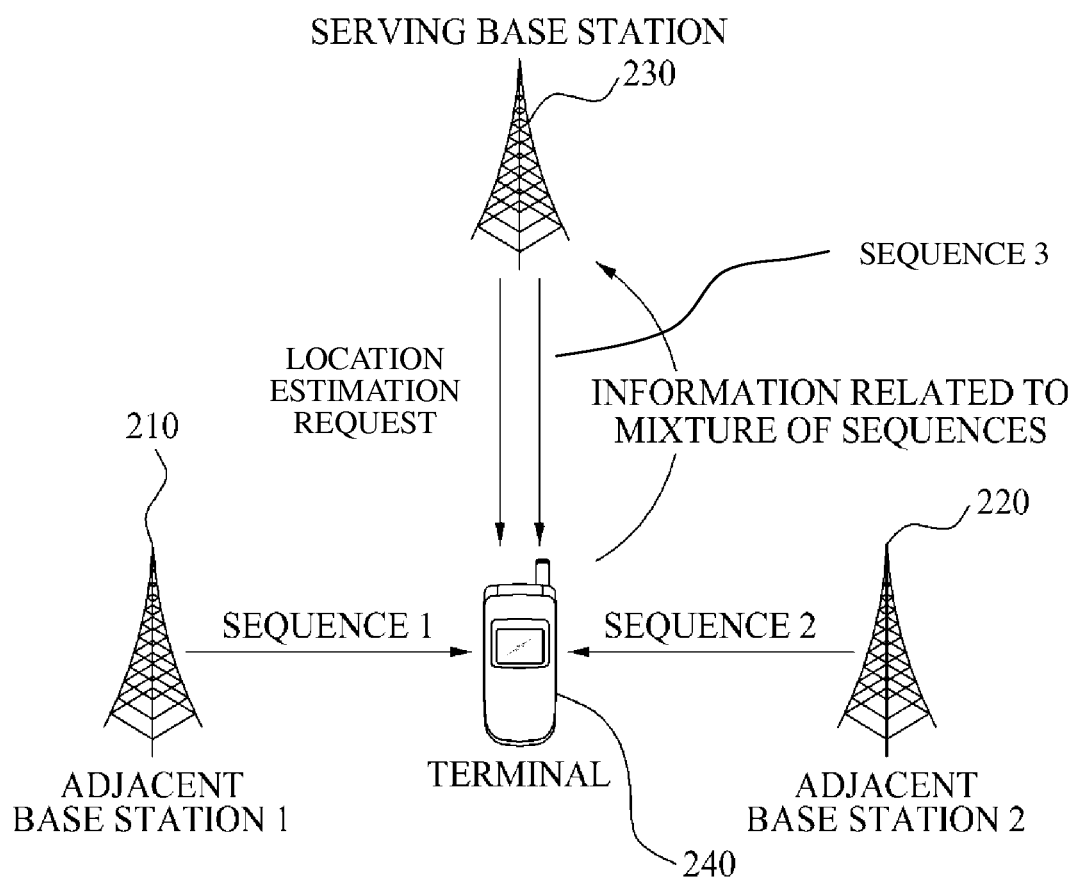
FIG. 2 is a diagram illustrating an example of a plurality of base stations and a terminal to perform a location estimating method.

FIG. 2 illustrates a plurality of base stations and a terminal to perform a location estimating method according to an example embodiment.

Referring to FIG. 2, a serving base station 230 transmits a location estimation request to a terminal 240 to estimate a location of the terminal 240. That is, the serving base station 230 may transmit the location estimation request to the terminal 240 according to a request from an outside or internal device to identify the location of the terminal 240.

The terminal 240 receives unique sequences respectively from the serving station 230, an adjacent base station (1) 210, and an adjacent base station (2) 220 in a predetermined frame in response to the location estimation request. For example, the predetermined frame is a frame or a next frame of the time when the location estimation request is received. Accordingly, each of the serving base station 230, the adjacent base station (1) 210, and the adjacent base station (2) 220 may generate a unique sequence based on a unique cell ID, and may transmit the unique sequence by using a synchronization channel at a same point in time.

More particularly, the adjacent base station (1) 210 may generate a sequence 1 based on a cell ID of the adjacent base station (1) 210, the adjacent base station (2) 220 may generate a sequence 2 based on a cell ID of the adjacent base station (2) 220, and the serving base station 230 may generate a sequence 3 based on a cell ID of the serving base station 230. Also, the adjacent base station (1) 210, the adjacent base station (2) 220, and the serving base station 230 respectively transmit the sequence 1, the sequence 2, and the sequence 3 through the synchronization channel at a same point in time.

The sequence 1, the sequence 2, and the sequence 3 that are transmitted at the same point in time may be mixed together in the terminal 240. Also, the terminal 240 may quantize a mixture of the received sequences 1, 2, and 3 as is without decoding, and may forward information related to the mixture of the quantized received sequence 1, 2, and 3 to the serving base station 230. Accordingly, the terminal 240 may forward the mixture of the quantized received sequences 1, 2, and 3 in its current state to the serving base station 230, and may encode the mixture of the quantized received sequences 1, 2, and 3 according to a predetermined channel code to generate information related to the mixture of the quantized received sequences 1, 2, and 3

The serving base station 230 may receive information related to the mixture of the quantized received sequences 1, 2, and 3. Also, the serving base station 230 may extract components respectively corresponding to sequences 1, 2, and 3 from the mixture of the quantized received sequences 1, 2, and 3. That is, as described above, the sequence 1, 2, and 3 are designed to be individually extracted even though the sequences 1, 2, and 3 are mixed, and thus, the serving base station 230 may extract the components respectively corresponding to each of the sequences 1, 2, and 3 from the mixture of the quantized received sequences 1, 2, and 3.

Figure 4:
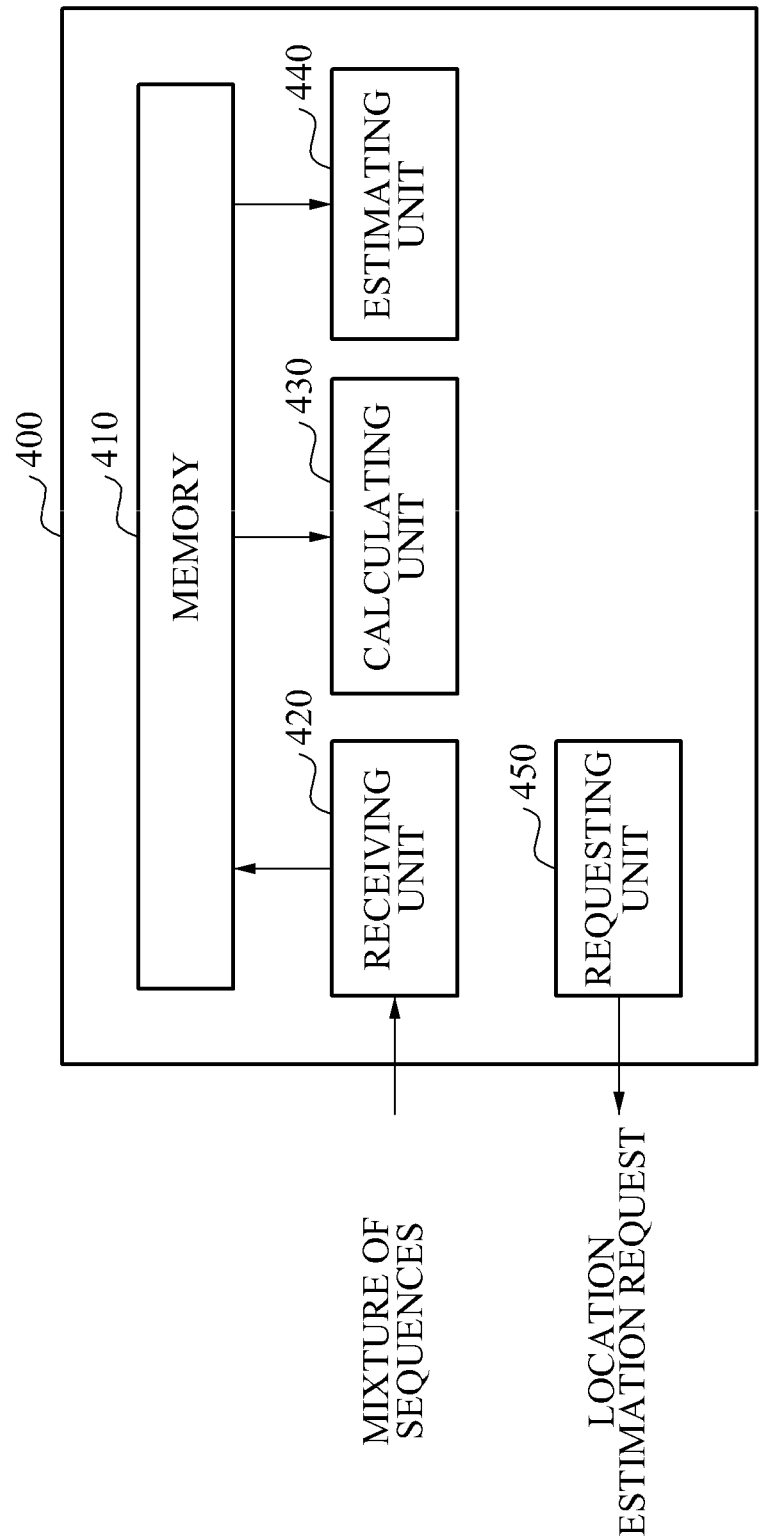
FIG. 4 is a block diagram illustrating an example of a location estimating device corresponding to a serving base station.

When the sequences 1, 2, and 3 are generated respectively based on a cell ID of the adjacent base station (1) 210, a cell ID of the adjacent base station (2) 220, and a cell ID the serving base station 230, the serving base station 230 may store the cell ID of the adjacent base station (1) 210, the cell ID of the adjacent base station (2) 220, and the cell ID of the serving base station 230 in a memory (as illustrated in FIG. 4) in advance. Also, the serving base station 230 may store all the sequences 1, 2, and 3 in the memory in advance, in addition to the cell ID of the adjacent base station (1) 210, the cell ID of the adjacent base station (2) 220, and the cell ID of the serving base station 230. In this instance, the serving base station 230 may determine, from the memory, the sequences 1, 2, and 3 or the cell ID of each of the adjacent base station (1) 210, the adjacent base station (2) 220, and the serving base station 230, and thereby may extract the components respectively corresponding to the sequences 1, 2, and 3 from the mixture of the quantized received sequences 1, 2, and 3.

When the serving base station 230 extracts the components respectively corresponding to the sequences 1, 2, and 3 from the mixture of the quantized received sequences 1, 2, and 3, the serving base station 230 may estimate the location of the terminal 240 based on the components respectively corresponding to the sequences 1, 2, and 3. That is, the serving base station 230 may estimate distances from each of the adjacent base station (1) 210, the adjacent base station (2) 220, and the serving base station 230 to the terminal 240 based on the components respectively corresponding to the sequences 1, 2, and 3, and may estimate the location of the terminal 240 based on the distances. It is assumed that the base station 230 is aware of the locations of the adjacent base station (1) 210, the adjacent base station (2) 220, and the serving base station 230.

More particularly, the serving base station 230 may calculate, based on components corresponding to each of the sequences 1, 2, and 3, received signal strengths or delays with respect to the sequences 1, 2, and 3 received by the terminal 240 from the adjacent base station (1) 210, the adjacent base station (2) 220, and the serving base station 230. The received signal strengths or the delays may indicate distances from the adjacent base station (1) 210, the adjacent base station (2) 220, and the serving base station 230 to the terminal 240.

As an example, where a power loss of the received sequence 1 is relatively high, a distance from the adjacent base station (1) 210 to the terminal 240 is estimated to be relatively far, and where a power loss of the received sequence 2 is relatively low, a distance from the adjacent base station (2) 220 to the terminal 240 is estimated to be relatively near. In the same manner, where a power loss of the received sequence 3 is relatively high, a distance from the serving base station 230 to the terminal 240 is estimated to be relatively far.

Accordingly, the serving base station 230 may estimate the location of the terminal 240 based on the received signal strengths or delays with respect to the received sequences 1, 2, and 3, respectively. Particularly, the serving base station 230 may know transmission power of the sequences 1, 2, and 3 in advance, and may estimate the location of the terminal 240 based on the transmission power of the sequences 1, 2, and 3.

For example, where transmission power of the sequence 1 is relatively high, the serving base station 230 may assign a relatively low weight to a received signal strength of the sequence 1 received by the terminal 240, and where transmission power of the sequence 2 is relatively low, the base station 230 may assign a relatively high weight to a received signal strength of a sequence 2 received by the terminal 240.

In this instance, the terminal 240 may estimate its own location, which will be described later in detail with reference to FIGS. 6 and 7.

Figure 3:
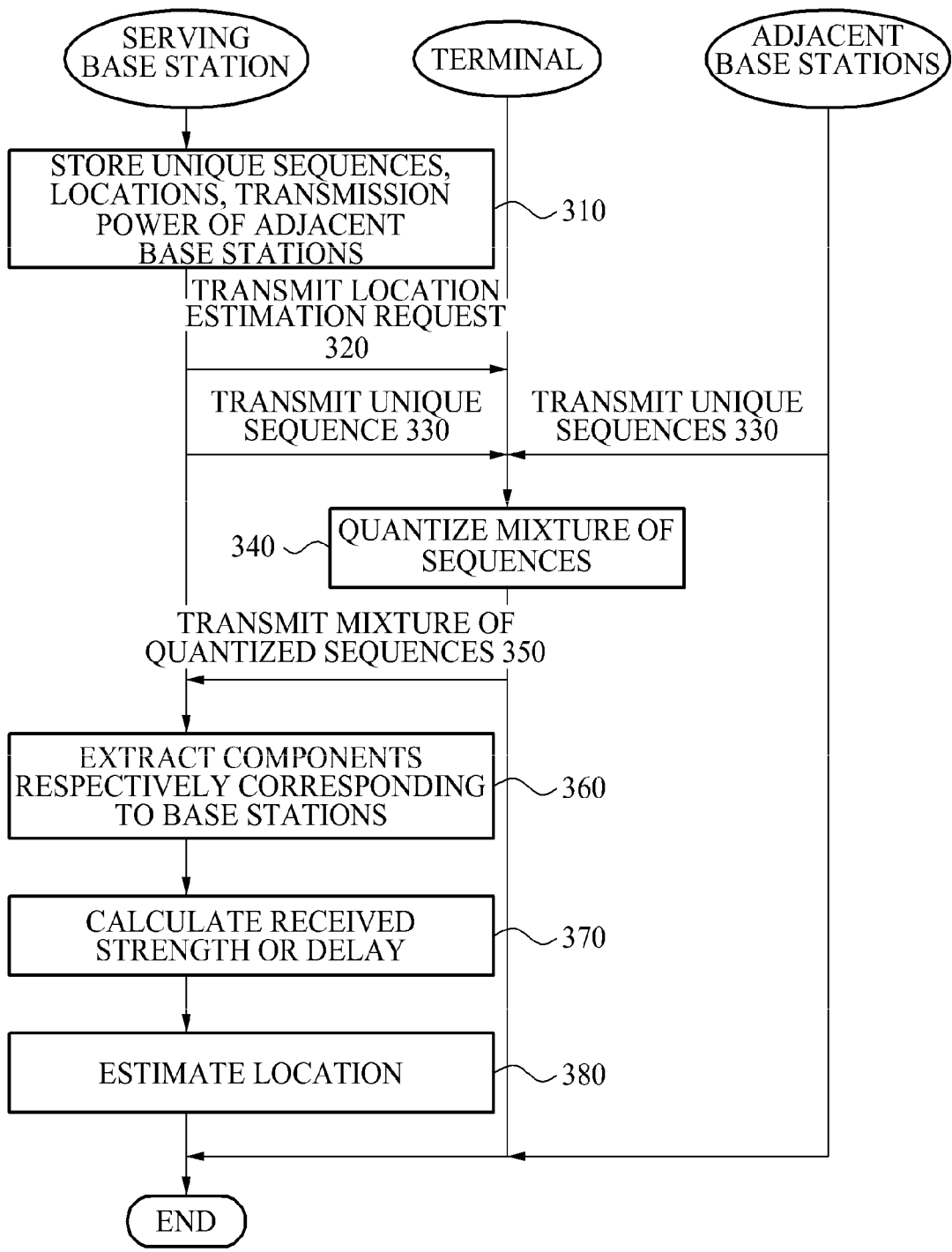
FIG. 3 is a flowchart illustrating an example of a location estimating method of a terminal.

FIG. 3 illustrates an example of a location estimating method of a terminal.

Referring to FIG. 3, a serving base station stores a unique sequence, a location, and a transmission power of each adjacent base station in a memory in advance at 310. Also, the serving base station transmits a location estimation request to a terminal to estimate a location of the terminal at 320.

Further, the serving base station and the adjacent base stations transmit unique sequences at a same point in time at identical time intervals at 330. In this instance, the terminal receives unique sequences transmitted at the same point in time in response to reception of the location estimation request.

Also, the terminal quantizes a mixture of the received unique sequences without decoding at 340. Also, at 350, the terminal transmits information related to the mixture of the quantized received unique sequences to the serving base station.

Also, the serving base station extracts components respectively corresponding to base stations from mixture of the sequences received by the terminal at 360. Also, the serving base station calculates received signal strengths or delays of the unique sequences received by the terminal based on components respectively corresponding to the base stations at 370.

Also, the serving base station estimates the location of the terminal by using the memory that stores the unique sequence, the location, and transmission power of each of the base stations, based on the received signal strengths or the delays of the received unique sequences at 380.

Although not described in FIG. 3, the estimated location of the terminal may be provided to the outside or may be used by the serving base station for various purposes.

FIG. 4 illustrates an example of a location estimating device corresponding to a serving base station.

Referring to FIG. 4, a location estimating device 400 includes a memory 410, a receiving unit 420, a calculating unit 430, an estimating unit 440, and a requesting unit 450.

The memory 410 may include cell IDs, unique sequences, and transmission power of adjacent base stations and the serving base station.

Also, the receiving unit 420 receives information related to the mixture of the quantized unique sequences from the terminal and stores the information in the memory 410.

Further, the calculating unit 430 reads the information related to the mixture of the quantized unique sequences and may calculate a received signal strength or a delay of each of the unique sequences received by the terminal based on the mixture of the quantized unique sequences.

Figure 7:
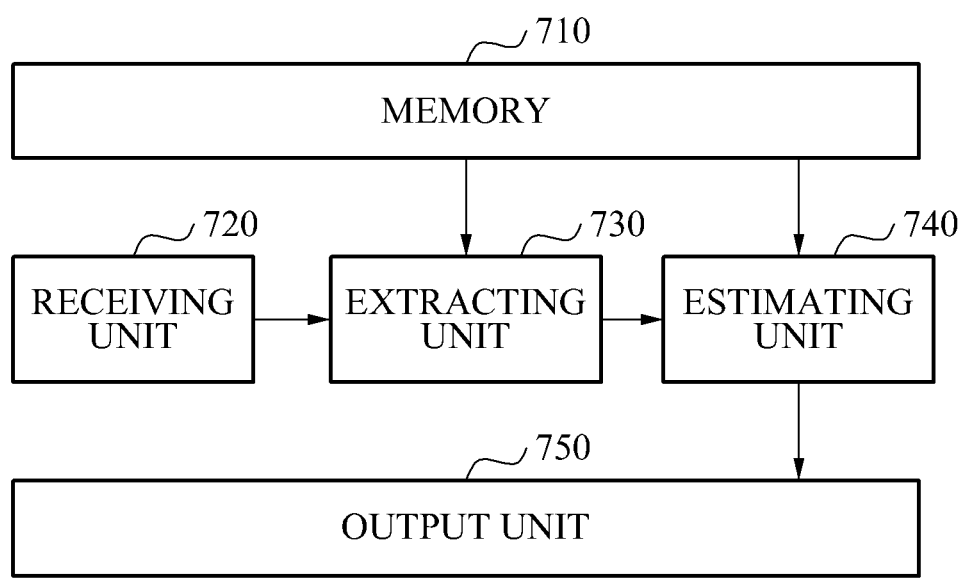
FIG. 7 is a block diagram illustrating another example of a location estimating device corresponding to a terminal.

As illustrated in FIG. 7, the calculating unit 430 may include an extracting unit to extract components respectively corresponding to base stations from the mixture of the quantized unique sequences. That is, the calculating unit 430 may calculate the received signal strength or the delay of each of the unique sequences received by the terminal based on the extracted components respectively corresponding to the base stations.

Also, the estimating unit 440 estimates a location of the terminal referring to cell IDs, unique sequences, transmission power of the serving base station and adjacent base stations stored in the memory 410 based on the received signal strength or delay of each of the received unique sequences.

Furthermore, the requesting unit 450 transmits the location estimation request to the terminal when estimating of the location is required.

Figure 5:
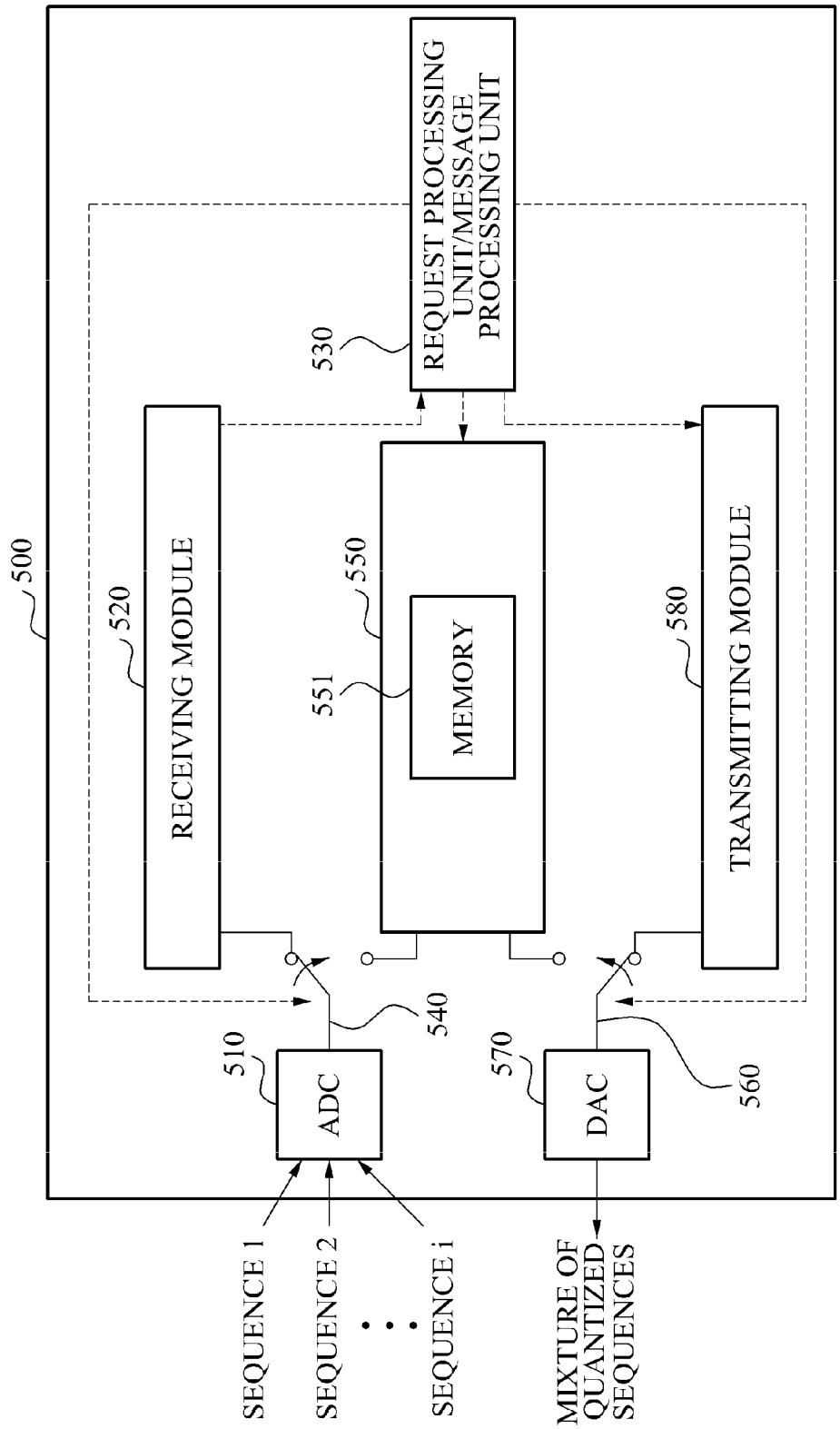
FIG. 5 is a block diagram illustrating an example of a location estimating device corresponding to a terminal.

FIG. 5 illustrates an example of a location estimating device corresponding to a terminal.

Referring to FIG. 5, a location estimating device 500 includes an Analog to Digital Converter (ADC) 510, a receiving module 520, a request processing unit/message processing unit 530, switches 540 and 560, a sequence receiving unit 550, a Digital to Analog Converter (DAC) 570, and a transmitting module 580.

Where a location estimation request is received from the serving base station, the switch 540 is connected to the sequence receiving unit 550 by the request processing unit/message processing unit 530. Also, the ADC 510 quantizes sequences received from various base stations into digital signals. In this instance, the quantized sequences are provided to the sequence receiving unit 550.

The sequence receiving unit 550 may include a memory 551, which stores the quantized sequences.

After the quantized sequences are stored in the memory 551, the switch 560 is connected to the sequence receiving unit 550 by the request processing unit/message processing unit 530, and the quantized sequences are converted again into analog signals by a DAC 570, which are then transmitted to the serving base station by any type of conventional transmitting unit (not illustrated). In this instance, a channel coding may be selectively applied.

Also, unlike illustration of FIG. 5, the conventional transmitting unit may transmit the quantized sequences without modification to the serving base station.

The receiving module 520 may receive various requests, data, and the like. Particularly, the receiving module 520 may receive the location estimation request and may provide the location estimation request to the request processing unit/message processing unit 530. Also, requests, data, and the like provided by the transmitting module 580 are provided by the request processing unit/message processing unit 530.

Figure 6:
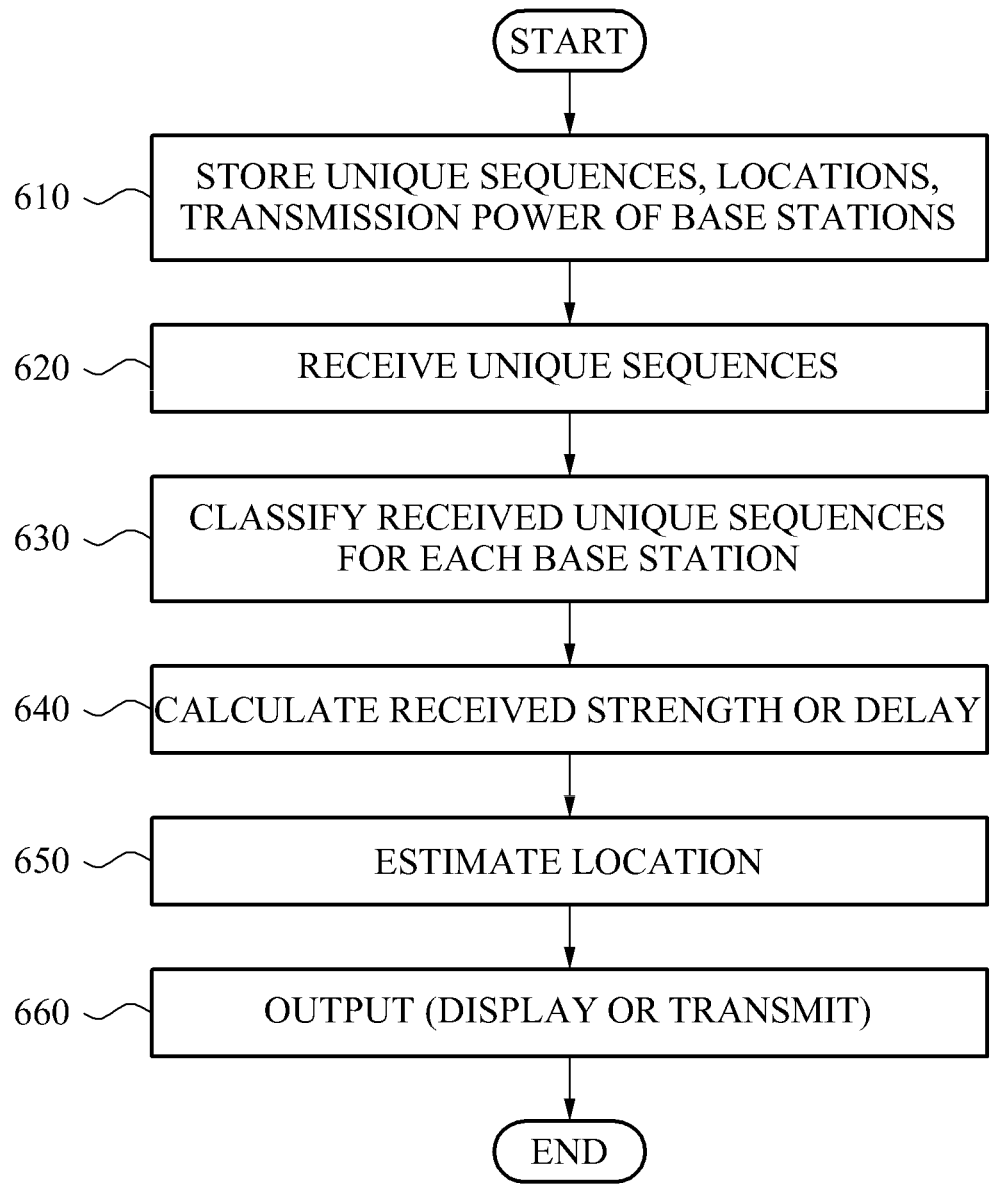
FIG. 6 is a flowchart illustrating another example of a location estimating method of a terminal.

FIG. 6 illustrates another example of a location estimating method of a terminal.

Referring to FIG. 6, the terminal according to other example embodiments stores a unique sequence, a location, and transmission power of each of base stations in a memory at 610.

At 620, the terminal receives unique sequences from the base stations.

At 630, the terminal classifies received unique sequences for each base station based on the unique sequence of each base station, the unique sequence being stored in advance, and extracts components respectively corresponding to the base stations.

At 640, the terminal calculates a received signal strength or a delay of each of the received unique sequences based on components respectively corresponding to the base stations.

At 650, the terminal estimates the location of the terminal by referring to a location and transmission power of each of the base stations, which are stored in the memory in advance, based on the received signal strength or delay of each of the received unique sequences.

At 660, the terminal displays information related to the estimated location or transmits the information to the base stations or other external devices.

FIG. 7 illustrates another example of a location estimating device corresponding to a terminal.

Referring to FIG. 7, the location estimating device according to other example embodiments includes a memory 710, a receiving unit 720, an extracting unit 730, an estimating unit 740, and an output unit 750.

The memory 710 may store a unique sequence, a location, and transmission power of each of base stations.

The receiving unit 720 may receive unique sequences transmitted from the base stations and may provide a mixture of received unique sequences to the extracting unit 730. In this instance, the extracting unit 730 may extract components respectively corresponding to the base stations from the mixture of the received unique sequences.

The estimating unit 740 may estimate a location of the terminal based on the components respectively corresponding to the base stations, locations and transmission power of the base stations, and may provide the information related to the estimated location of the terminal to the output unit 750. In this instance, the output unit 750 may display the information related to the estimated location or may transmit the information to base stations or other external devices.

The above descriptions regarding FIGS. 1 through 6 are applicable to the terminal and elements of the terminal illustrated in FIG. 7, and thus, detailed description thereof will be omitted for conciseness.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A location estimating method used in a serving base station, the method comprising:
    receiving, at the serving base station, information related to a mixture of unique sequences received by a terminal and transmitted from adjacent base stations;
    extracting, at the serving base station, components respectively corresponding to the adjacent base stations from the mixture of the unique sequences received by the terminal; and
    estimating, at the serving base station, a location of the terminal based on the components respectively corresponding to the adjacent base stations and the transmission power of each adjacent base station with respect to each of the unique sequences, wherein
    the unique sequences are generated using a constant amplitude zero auto-correlation (CAZAC) code, an m-sequence, or an orthogonal code.

2. The method of claim 1, wherein the estimating of the location of the terminal comprises:
    estimating the location of the terminal based on the components respectively corresponding to the adjacent base stations and locations of the adjacent base stations.

3. The method of claim 1, wherein the estimating of the location of the terminal comprises:
    predicting distances between the terminal and the adjacent base stations based on the components respectively corresponding to the adjacent base stations; and
    estimating the location of the terminal based on the distances between the terminal and the adjacent base stations.

4. The method of claim 1, wherein the estimating of the location of the terminal comprises:
    calculating received signal strengths or delays with respect to the unique sequences received from the adjacent base stations based on the components respectively corresponding to the adjacent base stations; and
    estimating the location of the terminal based on the received signal strengths or the delays with respect to the unique sequences received from the adjacent base stations.

5. The method of claim 1, wherein the extracting of the components comprises:
    extracting the components respectively corresponding to the adjacent base stations by using a memory where the unique sequences of the adjacent base stations or cell identifications (IDs) of the adjacent base stations are stored in advance.

6. The method of claim 1, wherein the information related to the mixture of the unique sequences received by the terminal includes information that is generated by quantizing the mixture of the unique sequences received by the terminal.

7. The method of claim 1, wherein each of the unique sequences is designed to be individually extracted from the mixture of the unique sequences.

8. The method of claim 1, wherein each of the unique sequences is generated based on a cell identification (ID) of each of the adjacent base stations, and the unique sequences are transmitted respectively from the adjacent base stations at a same point in time via a synchronization channel.

9. The method of claim 1, further comprising:
transmitting a location estimation request to the terminal to estimate the location of the terminal.

10. A location estimating method used in a terminal, the method comprising:
receiving, at the terminal, a location estimation request from a serving base station;
receiving, at the terminal, unique sequences transmitted from adjacent base stations;
transmitting, in response to the location estimation request, information related to a mixture of the received unique sequences from the terminal to the serving base station; and
estimating, at the serving base station, a location of the terminal based on the transmission power of each adjacent base station with respect to each of the unique sequences, wherein
the unique sequences are generated using a constant amplitude zero auto-correlation (CAZAC) code, an m-sequence, or an orthogonal code.

11. The method of claim 10, further comprising:
quantizing the mixture of the received unique sequences without decoding the received unique sequences, to generate information related to the mixture of the received unique sequences.

12. The method of claim 10, wherein the receiving of the unique sequences simultaneously receives the unique sequences respectively from the adjacent base stations via a synchronization channel.

13. A location estimating method used in a terminal, the method comprising:
receiving, at the terminal, unique sequences transmitted from at least two base stations;
extracting, at the terminal, components respectively corresponding to the at least two base stations from a mixture of the unique sequences received by the terminal; and
estimating, at the terminal, a location of the terminal based on the components respectively corresponding to the base stations and the transmission power of each base station with respect to each of the unique sequences, wherein
the unique sequences are generated using a constant amplitude zero auto-correlation (CAZAC) code, an m-sequence, or an orthogonal code.

14. The method of claim 13, further comprising:
outputting information related to the estimated location of the terminal.

15. The method of claim 13, wherein the estimating of the location of the terminal comprises:
calculating received signal strengths or delays with respect to the unique sequences received from the at least two base stations based on the components respectively corresponding to the at least two base stations; and
estimating the location of the terminal based on the received signal strengths or delays with respect to the unique sequences received from the at least two base stations.

16. A non-transitory computer-readable storage medium storing a program to perform a location estimating method in a serving base station, comprising instructions to cause a computer to:
receive, at the serving base station, information related to a mixture of unique sequences received by a terminal and transmitted from adjacent base stations;
extract, at the serving base station, components respectively corresponding to the adjacent base stations from the mixture of the unique sequences received by the terminal; and
estimate, at the serving base station, a location of the terminal based on the components respectively corresponding to the adjacent base stations and the transmission power of each adjacent base station with respect to each of the unique sequences, wherein
the unique sequences are generated using a constant amplitude zero auto-correlation (CAZAC) code, an m-sequence, or an orthogonal code.

17. A location estimating device used in a serving base station, the device comprising:
a receiving unit to receive, at the serving base station, information related to a mixture of unique sequences received by a terminal and transmitted from adjacent base stations;
an extracting unit to extract, at the serving base station, components respectively corresponding to the adjacent base stations from the mixture of the unique sequences received by the terminal; and
an estimating unit to estimate, at the serving base station, a location of the terminal based on the components respectively corresponding to the adjacent base stations and the transmission power of each adjacent base station with respect to each of the unique sequences, wherein
the unique sequences are generated using a constant amplitude zero auto-correlation (CAZAC) code, an m-sequence, or an orthogonal code.

18. The device of claim 17, further comprising:
a calculating unit to calculate received signal strengths or delays with respect to the unique sequences received from the adjacent base stations, based on the components respectively corresponding to the adjacent base stations,
wherein the estimating unit estimates the location of the terminal based on at least one of the received signal strengths and delays with respect to the unique sequences received from the adjacent base stations and also based on locations of the adjacent base stations.

19. The device of claim 17, further comprising:
a requesting unit to transmit a location estimation request to the terminal to estimate the location of the terminal.

* * * * *